United States Patent Office 3,705,832
Patented Dec. 12, 1972

3,705,832
PROCESS FOR JOINING CELLULOSE ARTICLES UTILIZING A TWO-PART ADHESIVE, WHEREIN THE FIRST PART IS A PARTIALLY REACTED CONDENSATE OF RESORCINOL AND FORMALDEHYDE, AND THE SECOND PART IS AN OXAZOLIDINE
John T. Stephan, Longview, and A. J. Golick, Seattle, Wash., assignors to Commercial Solvents Corporation, New York, N.Y.
No Drawing. Original application Apr. 10, 1969, Ser. No. 815,198. Divided and this application Nov. 12, 1970, Ser. No. 89,142
Int. Cl. C09j 5/04
U.S. Cl. 156—310
4 Claims

ABSTRACT OF THE DISCLOSURE

An adhesive composition suitable for the manufacture of laminated cellulosic products by joining the surfaces of two or more cellulosic articles comprising a partially fusible resorcinol-formaldehyde resin and an oxazolidine corresponding to the following formula:

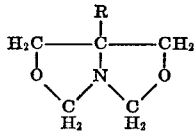

where R can be methyl, ethyl or hydroxymethyl.

This application is a division of application Ser. No. 815,198, filed Apr. 10, 1969, now abandoned.

BACKGROUND OF THE INVENTION

This invention relates to an adhesive composition. In a particular aspect, this invention relates to adhesive compositions having particular utility for the manufacture of laminated cellulosic articles.

The use of adhesives to prepare laminated cellulosic products, e.g. plywood, paperboard and the like, is an old, well-known process and many different adhesives have been suggested. Presently protein adhesives and low temperature-curing resorcinol-formaldehyde resins are in widespread use for the production of laminated timbers.

Several problems have been encountered in using resorcinol-formaldehyde resins in this process; namely, (1) the reactivity on the glue line over the prevailing temperature ranges which gives a short working life to the adhesive-coated articles resulting in layup times which are very short, and (2) the release of free formaldehyde during application when using paraformaldehyde-containing resorcinol adhesives which can result in a health hazard or at least a disagreeable environment to the workers. Adhesives presently in use have a pot life of about 3 to 4 hours, depending on the amount of paraformaldehyde added and the alkalinity of the adhesive. An extension of this working time would be beneficial.

SUMMARY OF THE INVENTION

It is an object of this invention to provide an improved adhesive for laminating cellulosic articles.

Another object of this invention is to provide adhesives having a longer pot life, or working time, than those presently used for laminating cellulosic articles.

It is still another object of this invention to provide an adhesive composition which is free from formaldehyde vapors.

Other objects will be apparent to those skilled in the art from the disclosure herein.

It has been discovered that the above objects are fulfilled by coating the two surfaces to be joined with a two component adhesive combination comprising a resorcinol-formaldehyde resin and a bicyclic oxazolidine corresponding to the following formula:

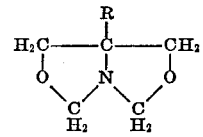

wherein R can be methyl, ethyl or hydroxymethyl. It is also within the scope of the present invention to coat one of the surfaces with one component and the other surface with the second component and then joining the said surfaces.

DETAILED DISCUSSION

The present invention comprises a two-component adhesive system consisting of a resorcinol-formaldehyde resin and a substituted oxazolidine corresponding to the formula set forth above. The proportion of resin to oxazolidine is not critical but generally the best results are obtained at a ratio of about 20 parts of resin to from 1 to 4 parts by weight of oxazolidine. However, when R is hydroxymethyl in the above formula, the preferred proportion is in the range of about 8–12:1 and a proportion of 10:1 is particularly preferred. When R is methyl or ethyl the compound is more reactive and a proportion in the range of about 15–20:1 is preferred, with a proportion of 20:1 being particularly preferred.

The adhesive compositions of this invention are particularly suitable for use in manufacturing laminated cellulosic articles, such as laminated timbers, plywood and paper articles. The compositions also are useful in the separate application process, e.g. as described in U.S. Pat. 2,015,806, where one component is applied to one surface and the second component is applied to the other surface. When the two surfaces are joined and pressure sufficient to provide intimate contact is applied, the components react to form a powerful bond. It is also suitable to premix the two components and apply the mixture to the surfaces to be joined. However, the high reactivity of the two components gives only a short working time.

The resorcinol-formaldehyde resin systems suitable for use in the practice of this invention are known in the art. These resins are fusible, partially reacted condensates of resorcinol and formaldehyde in the ratio of about 1 mole of resorcinol to about 0.5–0.8 mole of formaldehyde. Such fusible partially reacted resins may be prepared by heating a concentrated aqueous solution of resorcinol and formaldehyde either with or without a catalyst such as oxalic acid, as described in U.S. Pats. 2,385,370; 2,385,371; 2,385,374; 2,414,415; which are incorporated herein by reference thereto.

The bicyclic oxazolidines used in the adhesives of the present invention may be prepared according to the method of Murray Senkus, J. M. Chem. Soc. 67, 1515–1519 (1945) or that of William B. Johnson, U.S. Pat. No. 2,448,890. Generally these compounds are made by the reaction of 2 moles of formaldehyde with 1 mole of 2-amino-2-hydroxymethyl-1,3-propanediol; 2-amino-2-methyl-1,3-propanediol; or 2-amino-2-ethyl-1,3-propanediol. Other oxazolidines are known in the art but generally they are less satisfactory than the oxazolidines of the present invention.

The components of the adhesives of the present invention react readily at room temperature, so it is not necessary to heat the assembled articles, e.g. laminated timbers. However, the application of heat accelerates the rate of setting and with the adhesives of the present invention extremely fast setting can be obtained. When such fast setting is desired, temperatures commonly used in the art are employed with these adhesives, e.g. from about 250–300° F. or more.

The above invention can be better understood by reference to the following examples. It is understood, of course, that these examples are only for the purpose of illustration and the invention is not intended to be limited thereby.

Example 1

A resorcinol-formaldehyde resin was prepared in the laboratory by mixing 100 g. of resorcinol with 600 g. of 37% by weight formaldehyde solution and 150 g. of water. It was then heated 30 min. under reflux at atmospheric pressure, circa 216° F. To this was added 87.8 g. of 49.3% NaOH solution mixed with 100 g. of water and the resin cooled to 70° F. A 100 g. portion of this resin was then mixed with 5 g. of oxazolidine T (5-hydroxymethyl-1-aza-3,7-dioxabicyclo[3,3,0]octane). The mixture set to a gel in 50 sec. at 212° F. and in 2 hrs., 15 min. at 70° F. It was of taffy-like consistency. The composition was determined to be suitable for use as an adhesive in the manufacture of plywood. By comparison, a mixture of 100 g. of the resin and 5 g. of 37% formaldehyde solution gelled in 2 minutes at 212° F.

Example 2

The experiment of Example 1 was repeated except that 2.5 g. of oxazolidine T was employed. The mixture did not gel in 3 hours at room temperature (70° F.), and remained the consistency of honey. The longer working life, compared with that in Example 4, was judged to be advantageous.

Example 3

Two sheets of ⅛ in. thick fir veneer face stock were coated on one side with a solution of 10% by weight of oxazolidine T at the rate of about 10 lb./1000 sq. ft. of single glue line, then dried. The resorcinol resin prepared in Example 1 was then applied to a sheet of ⅛ in. fir core at the rate of about 80 lb./1000 sq. ft. of single glue line, and the treated core was sandwiched between the two sheets of ⅛ in. face veneers and placed in the hot press for 3 min. at 285° F. A ⅜ in., 3-ply panel was obtained which exhibited an excellent bond. The ratio of resorcinol resin to oxazolidine T was about 40 to 1.

Example 4

The experiment of Example 1 was repeated except oxazolidine E (5-ethyl-1-aza-3,7-dioxabicyclo[3,3,0]-octane), 5 ml. (about 5.35 g.) was substituted for oxazolidine T. The mixture became taffy-like in 3 min. and a hard gel in 25 min. It was determined that 2-3 g. of oxazolidine E provides a longer working life than when 5 g. is used.

Example 5

The experiement of Example 4 was repeated except that 2.5 g. oxazolidine M (5-methyl-1-aza-3,7-dioxabicyclo[3,3,0]octane) is substituted for oxazolidine E. A suitable adhesive having a satisfactory working life is obtained.

We claim:

1. In a process for joining two surfaces of at least two cellulosic articles by applying a fusible, partially reacted condensate of resorcinol and formaldehyde to one surface and a second component capable of forming an adhesive with said condensate to the second surface and then joining said surfaces, the improvement consisting of applying as said second component an oxazolidine corresponding to the formula

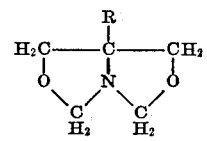

wherein R can be methyl, ethyl or hydroxymethyl, in a weight ratio of from about 20:1–4 parts of said resin to said oxazolidine.

2. The process of claim 1 wherein R is methyl.
3. The process of claim 1 wherein R is ethyl.
4. The process of claim 1 wherein R is hydroxymethyl.

References Cited

UNITED STATES PATENTS

| | | | |
|---|---|---|---|
| 3,518,159 | 6/1970 | Freeman et al. | 156—335 X |
| 2,981,652 | 4/1961 | Peterson et al. | 156—310 |
| 2,724,675 | 11/1955 | Williams | 161—262 X |
| 3,256,137 | 6/1966 | Danielson | 260—839 X |
| 3,266,970 | 8/1966 | Paul | 260—839 X |
| 3,267,053 | 8/1966 | Nagle et al. | 156—335 X |
| 3,437,542 | 4/1969 | Mills | 161—188 X |

ROBERT F. BURNETT, Primary Examiner

J. C. GIL, Assistant Examiner

U.S. Cl. X.R.

156—331, 335; 161—188, 259, 262, 264; 260—839